Nov. 18, 1969   G. RETHMEIER   3,478,959
CONTROLS FOR BUSINESS MACHINES SUCH AS BOOKKEEPING
MACHINES AND THE LIKE
Filed Dec. 15, 1967   10 Sheets-Sheet 4
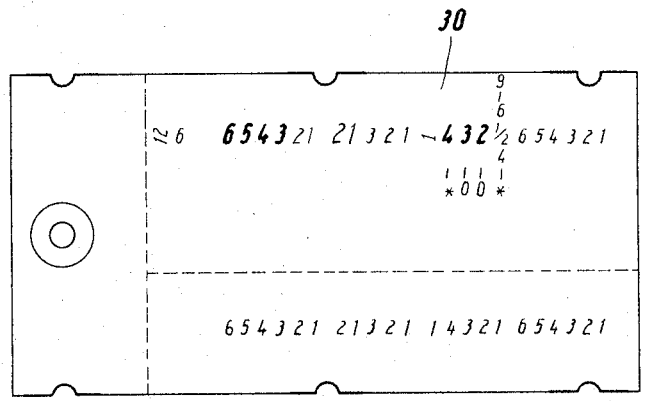
Fig. 4
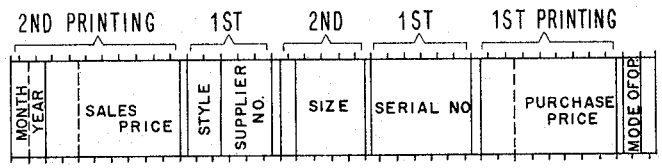
Fig. 11
|  | RECEIVING DATE | F | PRINTING OF CONSTANTS |
|---|---|---|---|
|  |  |  | PRINTING OF CONSTANTS |
| STYLE NO. | SUPPLIER | PURCHASE PRICE | FIRST PRINTING |
| SEASON | SIZE | SALES PRICE | SECOND PRINTING |
Fig. 12
Inventor:

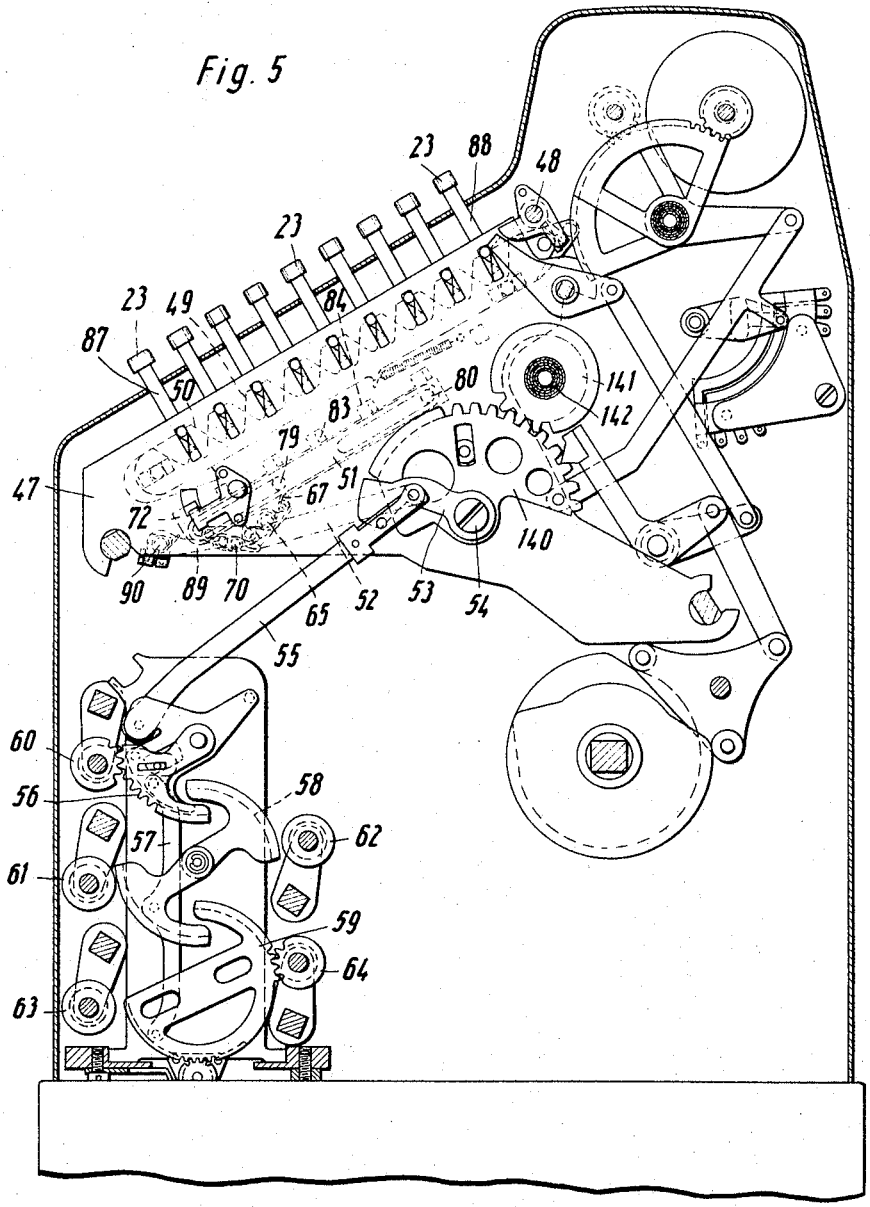

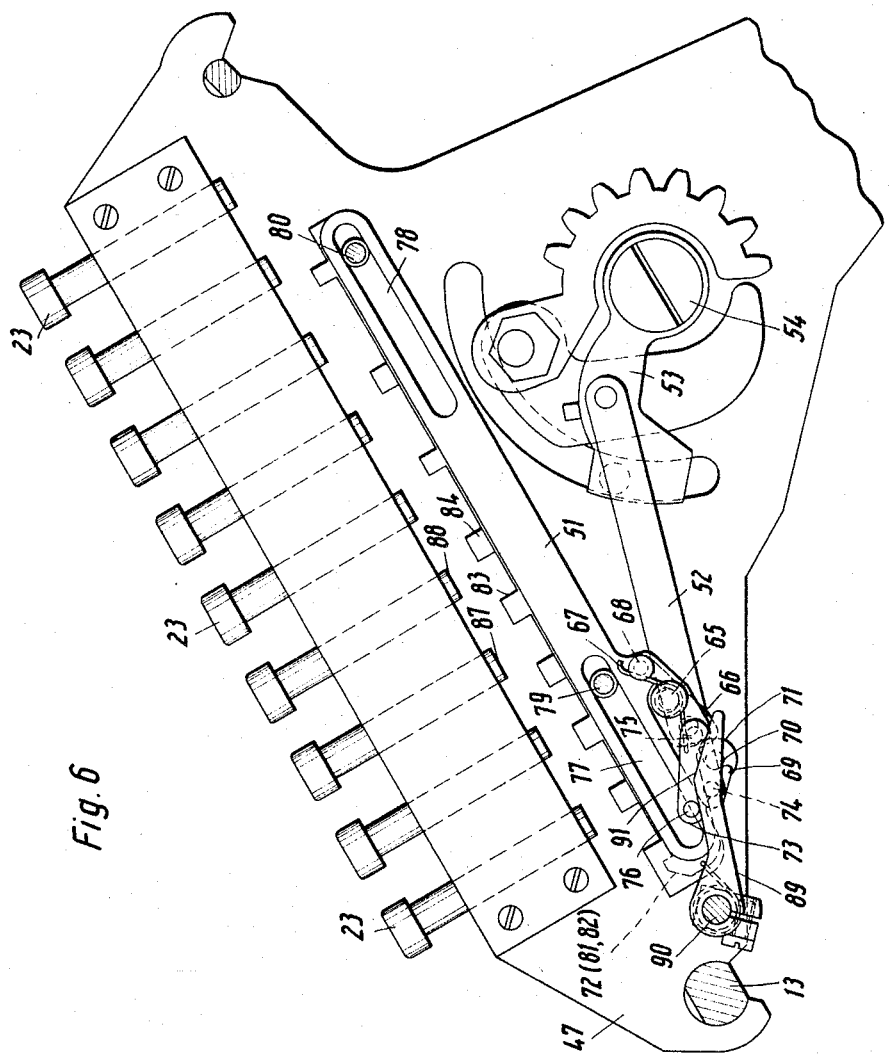

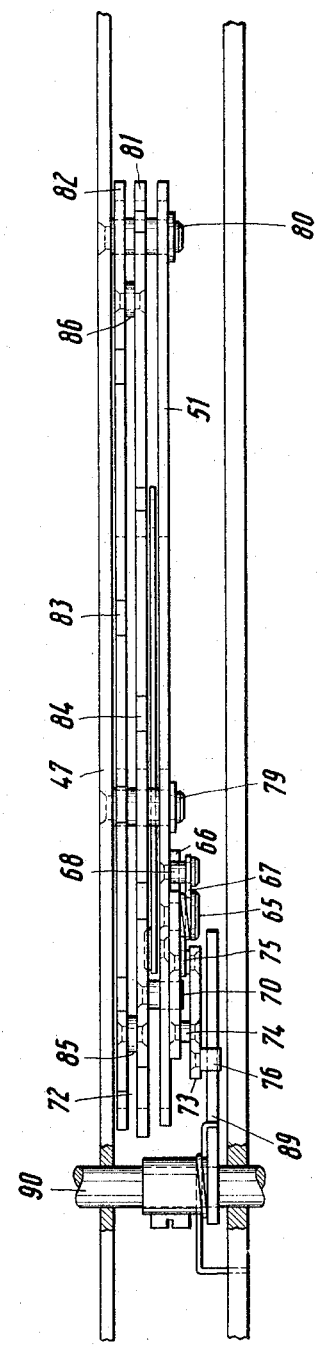

Nov. 18, 1969     G. RETHMEIER     3,478,959
CONTROLS FOR BUSINESS MACHINES SUCH AS BOOKKEEPING
MACHINES AND THE LIKE
Filed Dec. 15, 1967     10 Sheets-Sheet 10

Inventor:

United States Patent Office 3,478,959
Patented Nov. 18, 1969

3,478,959
CONTROLS FOR BUSINESS MACHINES SUCH AS BOOKKEEPING MACHINES AND THE LIKE
Gerhard Rethmeier, Oldentrup, Germany, assignor to Anker-Werke Aktiengesellschaft, Bielefeld, Germany, a corporation of Germany
Filed Dec. 15, 1967, Ser. No. 690,857
Claims priority, application Germany, Dec. 24, 1966, A 54,474
Int. Cl. G07g 5/00; G06c 29/00, 23/00
U.S. Cl. 235—3
8 Claims

ABSTRACT OF THE DISCLOSURE

A business machine such as a bookkeeping machine or the like having keyboard devices for posting values and other items of business transactions as well as control keys for selecting the particular machine operation desired, it also equipped with an accumulator for storing other value and information items. A key means is available to the operator of the machine for causing its calculating mechanisms to carry out various calculations by coacting at sequential machine runs with the keyboard means and with the accumulator respectively, so that item taken from both are processed and thus involved in the voucher printed by the machine.

My invention relates to business machines such as bookkeeping machines and the like.

In particular, my invention relates to control devices to be used with such machines which have keys for introducing various values and control functions as well as devices for selecting different machine runs and for automatically initiating the operation of machine runs sequentially.

With the introduction of data processing techniques by means of electronic data processing installations, the operation of such installations requires information-introducing media in the form of punch cards, mechanically readable vouchers, as well as punch tapes which are manufactured by punch card, registering, bookkeeping and similar machines. In order to process this information the information-carrying media must be provided not only with numerical values which are to be transferred in connection with the particular business transaction and the like, but also the information which is to be introduced or extracted ust be characterized in accordance with the type and the applicability of a particular business transaction. Business machines which have been manufactured to provide this type of information-carrying media are therefore provided with relatively large machine-setting fields which are provided with a plurality of value-setting keys and components controlled thereby.

As a result of the increase in the number of value-setting components, the facility with which the setting field of the business machine can be inspected is sharply reduced. Furthermore, every decade of value-setting keys requires corresponding calculating and printing components, so that such business machines are extremely expensive. Thus, because of the large number of required components such machines have high manufacturing costs and the sales thereof are reduced.

It is accordingly a primary object of my invention to provide a business machine, such as a bookkeeping machine or the like, which will avoid the above drawbacks while at the same time being capable of producing printed vouchers and the like which preferably are capable of being read mechanically.

Moreover, it is an object of my invention to provide a machine wherein the number of machine setting units is sharply reduced with respect to the number of printing positions which can be achieved with the machine.

It is, therefore, an object of my invention to provide a machine capable of deriving values to be printed and to be registered in the machine from components of the machine at least some of which have not previously been used for this purpose. Thus, one part of the values which which are printed and registered in the machine is derived from the keyboard of the machine while another part thereof is derived from the accumulator to be transferred to the printing mechanism and to the calculating mechanism during sequential automatically initiated machine runs with the machine runs alternately utilizing the information derived on the one hand from the keyboard and on the other hand from the accumulator, respectively.

A control structure for bookkeeping machine or the like having value and control keys as well as units for providing different machine runs during which different computing functions are carried out and devices for repeating the machine runs automatically during successive accounting functions or the like is provided, in accordance with my invention, with the structure which, during sequential machine runs, alternately transfers one part of the value data, such as a purchase price, from an accumulator means and another part, such as the sales price, from the keyboard field into the calculating mechanism and printing mechanism in order to register different values or other items in the calculating mechanism of the bookkeeping machine or the like and in order to print this information on vouchers or the like which issue from the machine.

It is already known in the art of calculating, bookkeeping, and registering machines to initiate sequential machine functions by means of repeating keys, where an amount introduced during a first machine run is, during the next-following machine run, derived either from the operating positions of value keys which are held in their depressed positions or from transfer, indicating, or printing components which were set during the previous machine run, as shown in German Auslegeschrift 1,073,775 as well as in U.S. Patent No. 2,821,341. Structures of this type, however, enable only a given amount to be repeatedly introduced into the machine.

Also, it is no longer new to provide calculating machines with constant factor accumulators, as shown in German Patent 378,077 and Austrian Patent 223,841. With such machines the stored factors can be utilized by means of special control keys in the particular computing function which is to be carried out. With machines of this type, however, it is not possible to use the value key field effectively as an accumulator for a plurality of different machine runs.

Thus, in accordance with one of the features of my invention, every bank of value keys of the keyboard of the machine is provided with a value key scanning slider of a differential mechanism which sets the calculating mechanism as well as the printing mechanism and also has an auxiliary slider which is in permanent driving connection with the differential mechanism, these sliders being releasably coupled to each other by a coupling device controlled by the structure which selects a particular machine function.

My invention is illustrated by way of example in the accompanying drawings which form part of this application and in which:

FIG. 4 illustrates a tag derived from the machine;

FIG. 5 shows in a side view a value key bank and structure coacting therewith;

FIG. 6 shows in a more detailed side view a value key bank of FIG. 5;

FIG. 7 is a plan view of the structure of FIG. 6;

Figure 8:
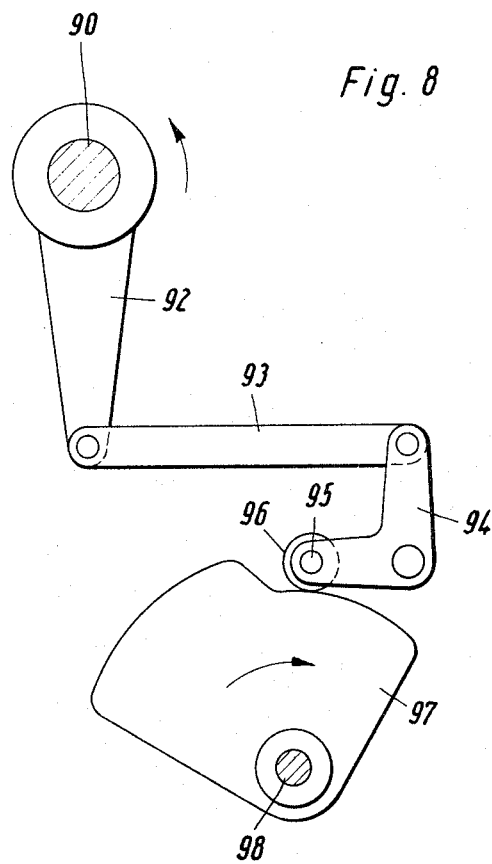
Figure 9:
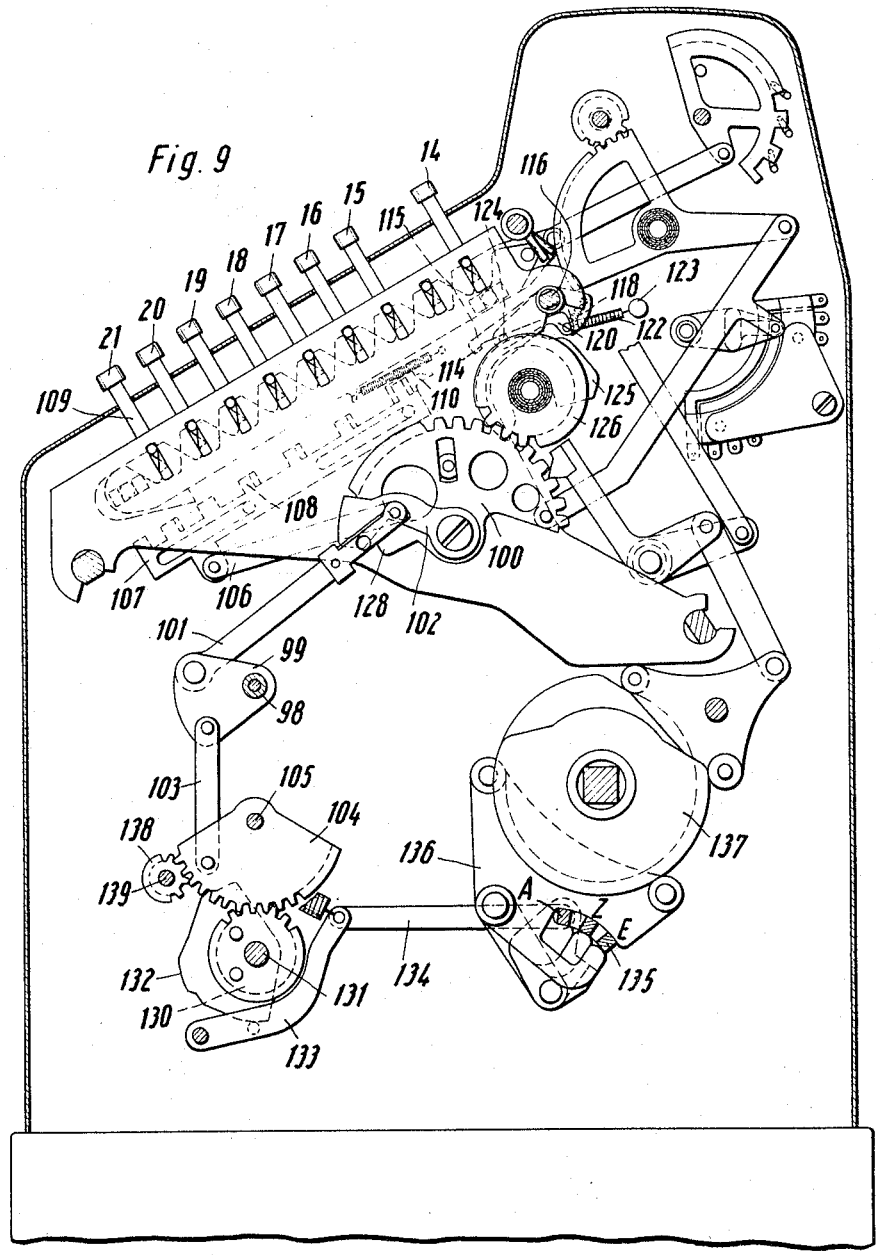
Figure 10:
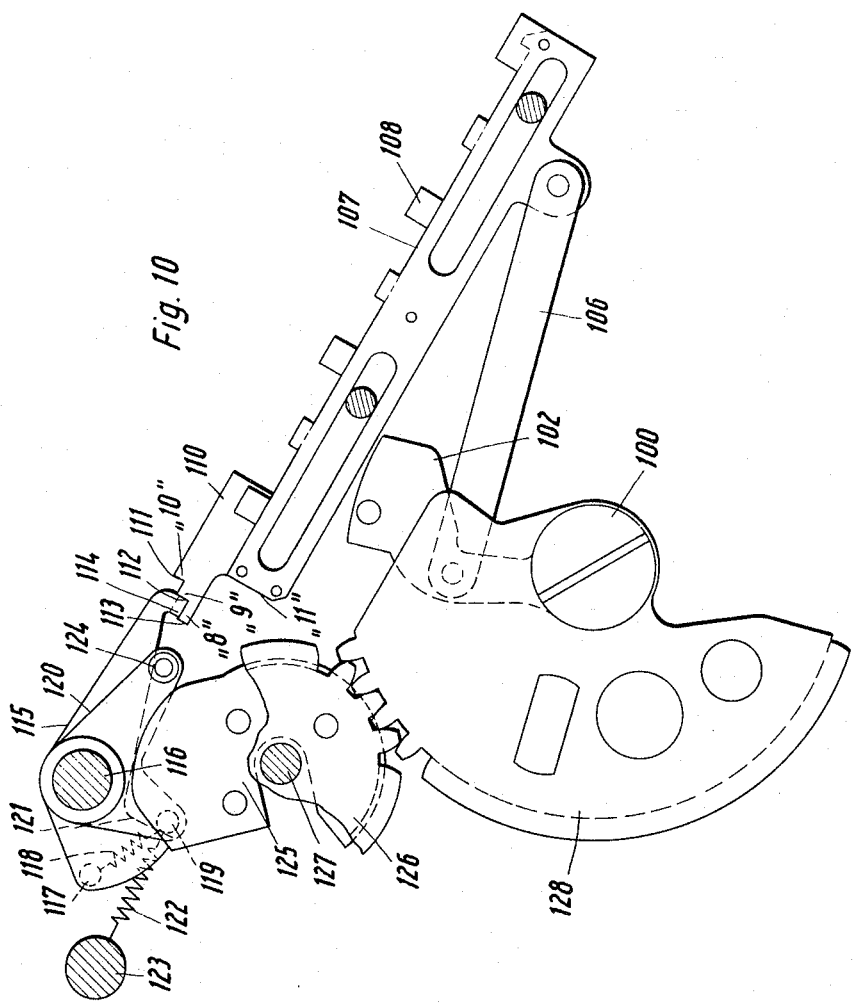

FIG. 8 schematically illustrates details of the control mechanism for the value key bank;

FIG. 9 shows in a side view the control key bank and structure coacting therewith;

FIG. 10 is a more detailed side view of structure of the control key bank;

FIG. 11 is a schematic showing of sequential printing operations; and

FIG. 12 is a schematic representation of sequential introduction of values into the machine.

Figure 1:
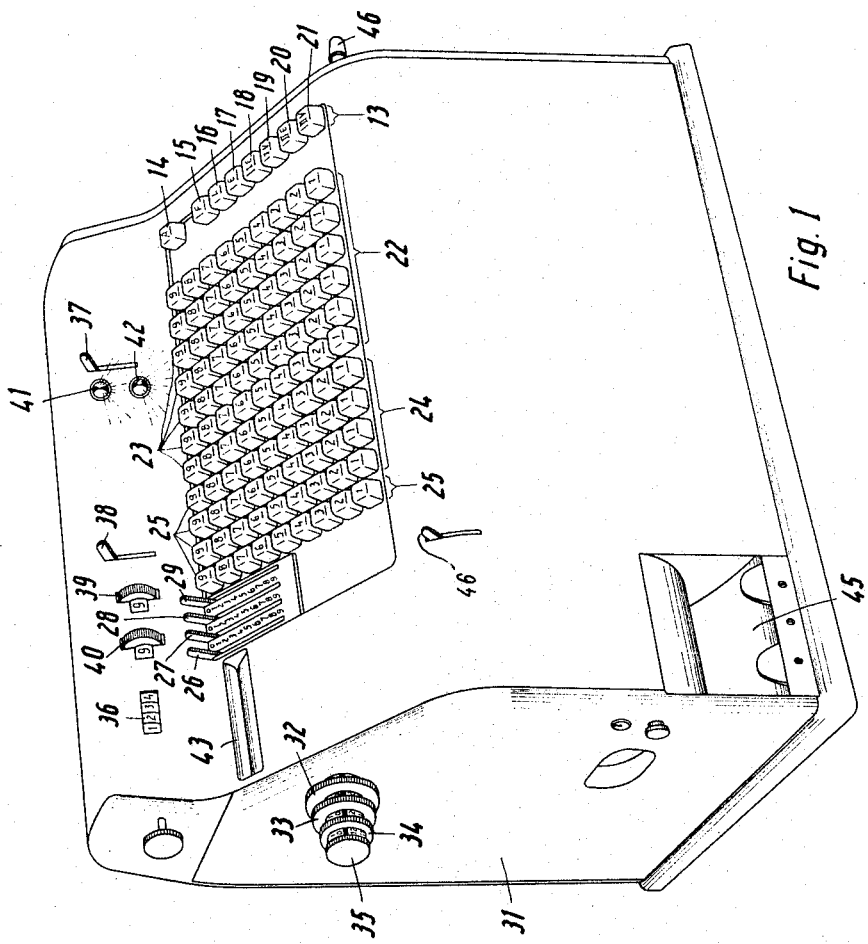
FIG. 1 is a perspective illustration of a tag-printing machine.

Referring now to FIG. 1, the bookkeeping machine which is illustrated therein and which is used in accordance with the invention for providing tags carrying different items of information, is provided with a row of control keys 13, the individual control keys 14–21 of which are provided for controlling the operation of the machine in connection with different machine runs during which different printing and totalizing operations are carried out. As may be seen from FIG. 2, the control key 14 is provided for initiating machine runs which sequentially follow one another, the control key 15 is provided for introducing constants, which serve to identify transactions on a punch tape which is produced, the control key 16 is used for clearing purposes and the control key 17 for entering values which are to be stored and which are required a number of times during sequentially following machine runs, and the control keys 18–21 are provided for controlling during totalizing machine runs the calculating mechanism which is described below. In addition to the row of control keys 13, the keyboard of the machine has six key rows 22 provided with the value keys 23 for introducing different values, four additional key rows 24 for introducing information such as article numbers, identification of suppliers, as well as article sizes, and the keyboard has an additional row 25 of keys which are provided for introducing special identification numerals.

In order to introduce a supplier's bill number, setting levers 26–28 (FIG. 1) are provided, and a setting lever 29 is provided for introducing a number identifying where given articles are stored. In order to be able to provide further individual entries on a tag 30 (FIGS. 3 and 4) which is to be produced, such as for example a delivery date, four coaxial setting wheels 32–35 are supported for rotary movement at the side wall 31 (FIG. 1) of the business machine, these wheels being used, for example, for indicating with suitable indicia such information as the arrival of the supplier's bill or the month when goods were received, or the like.

Furthermore, the machine is provided, as shown in FIG. 1 with a piece counter 36, a programming switch 37, and a counter 39, 40 used for initially introducing the number of tags which are to be produced and which in a known way turns the machine off when it reaches its zero position. The programming switch 37 coacts with a pair of lamps 41 and 42 arranged to indicate operating and non-operating positions of the switch 37.

Figure 3:
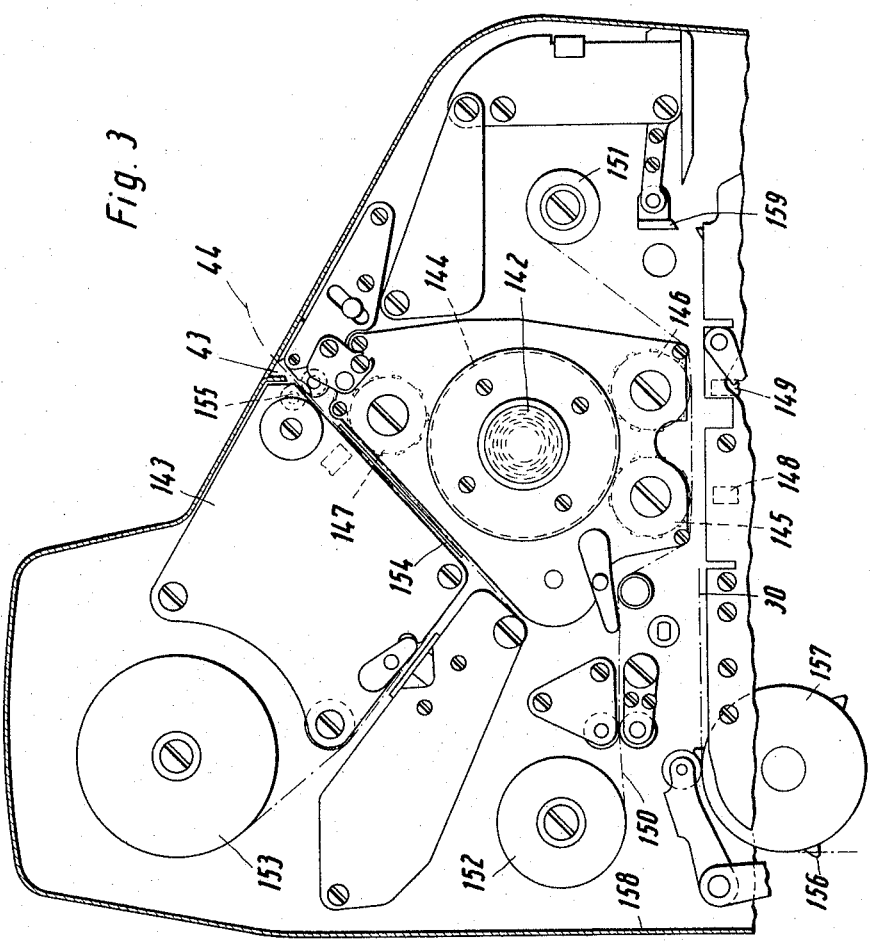
FIG. 3 is a schematic fragmentary side view of the printing mechanism.

Furthermore, as shown in FIG. 3, the business machine is provided with a control tape issuing device 43 serving to deliver the control tape 44 from the machine, and the machine is also provided with a delivery unit 45 (FIG. 1) through which the mechanically produced tags 30 issue from the machine. A clearing lever 46 is provided for intentional release of depressed keys.

Referring to FIG. 5, it will be seen that each row of value keys 23 of a value key bank 47 coacts in a known way with arresting and blocking sliders 49, 50. Also, as is shown in FIG. 7, each value key bank 47 is provided with an auxiliary slider 51 of a differential mechanism, this slider 51 being connected by way of a link 52 with a scanning lever 53 of the differential mechanism 54 indicated in FIG. 5. The scanning lever 53 also has linked thereto, as shown in FIG. 5, a pull bar 55 used for positioning a setting gear sector 56. This latter gear sector 56 is connected by way of a pull bar 57 with the setting segments or gear sectors 58 and 59, so that in this way the gear sectors 56, 58, and 59 are interconnected to provide through the bar 57 driving of the gear sectors 58 and 59 as a result of a drive taken from the gear sector 56. These toothed setting sectors 56, 58 and 59 are selectively brought into operative engagement with calculating mechanisms 60–64 arranged as illustrated in FIG. 5 with respect to these gear sectors, by way of an automatic calculating mechanism selecting device which is not illustrated and which is described in detail in U.S. Patent 3,066,861 and Reissue 25,431.

The arresting slider 49 can be shifted in a known way to its inoperative position by way of the clearing shaft 48 (FIG. 5) upon actuation of control keys 15–17 shortly before termination of a particular machine run which is being carried out in the machine, so that in this way those value keys 23 which have previously been depressed return to their starting positions. Only upon actuation of the control key 14 does the clearing shaft 48 remain inoperative, so that upon termination of an automatically performed run the value keys 23 are released by actuation of the clearing lever 46.

The calculating mechanism 60 is constructed as an accumulator means for storing values and is charged, by way of the value keys 23 in connection with the control key 17, with values which are required repeatedly for predetermined printing operations. The calculating mechanisms 61 and 62 take the form of adding mechanisms controlled by keys 18 and 20 while the calculating mechanisms 63 and 64 take the form of totalizing mechanisms controlled by keys 19 and 21.

As is indicated in FIG. 6, each key bank 47 is provided with an auxiliary slider means 51 to which a bearing pin 65 is riveted, and this bearing pin 65 serves to support for rotary movement a blocking hook 66 which is urged to turn in a counterclockwise direction, as viewed in FIG. 6, by a torsion spring 67 which at one end presses against a pin 68. This blocking hook 66 is provided with a downwardly directed mouth 69, as viewed in FIG. 6, which receive a pin 70 which is fixed to a projection 71 of a primary slider means 72 of the differential mechanism. As is apparent from FIG. 7 as well as FIG. 6, a trangular plate 73 is fixed to the blocking hook 66 by means of spacer pins 74 and 75, and a control pin 76 is riveted to this plate 73. The auxiliary slider means 51 as well as the primary slider means 72 are formed with longitudinal slots 77 and 78 through which stationary pins 79 and 80 respectively extend for guiding the slider means for longitudinal movement. The primary slider means 72 is composed of a pair of scanning member 81 and 82 (FIG. 7) formed from flat bars and provided with longitudinally offset rectangular scanning projections 83 and 84, these scanning members 81 and 82 being riveted together by way of spacer pins 85 and 86. The projections 83 and 84 coact with the shanks 87 and 88 of the value keys 23 in order to scan the latter and thus determine which keys have been depressed.

The control pin 76 is engaged by a control pawl 89 which is acted upon by a spring, which is fixedly clamped to a rotary operating shaft 90, and which is provided with an inclined slide surface 91 for engaging the pin 76. Thus, the blocking hook 66 coacts with the pin 70 to form therewith a coupling means for coupling the auxiliary slider means 51 with the primary slider means 72, and the coupling and uncoupling of the auxiliary and primary slider means with respect to each other is brought about by way of the rotary movement of the shaft 90 which acts through the pawl 89 on the control pin 76 to displace the blocking hook 66 of the coupling means with respect to the pin 70 thereof.

As may be seen from FIG. 8, the rotary control shaft 90 fixedly carries a lever 92 which is connected by way of a link 93 with a bell crank 94 supported for rotary movement about a stationary axis. The bell crank 94 carries a pin 95 which supports for rotary movement a cam follower roller 96 which engages a rotary control cam 97 to be influenced thereby, this cam 97 being fixed on the rotary control shaft 98. As may be seen from FIG. 9 the shaft 98 is angularly turned by means of a triangular plate 99 which is in driving connection with the differential mechanism 100 of the control key bank by way of a link 101 which is pivotally connected at one end to a scanning lever 102. By way of a pull bar 103 the plate 99 is linked with a toothed sector 104 supported for rotary movement on a stationary pin 105, the link 103 being pivotally connected at its opposite ends to the sector 104 and the plate 99.

The scanning lever 102 of the differential mechanism is in addition pivotally connected with one end of a link 106 whose opposite end is pivotally connected with the differential mechanism slider means 107. This slider means 107, as is shown more clearly in FIG. 10, is provided with scanning projections 108 for scanning the shanks 109 of the control keys 14–21 and is provided with a projection 110 which is riveted to the slider means 107 and which is provided with the stop shoulders 111, 112 and 113. These shoulders coact with the angularly bent tip 114 of an arresting lever 115. The angularly bent arresting lever 115 can, acording to the position of the slider means 107 of the differential mechanism, be held at the positions "8" to "11." This lever 115 is supported for rotary movement on a control shaft 116. The arresting lever 115 fixedly carries a pin 117 to which one end of a tension spring 118 is connected, this spring 118 also being connected to a pin 119 of an angled scanning lever 120 which is also supported for rotary movement by the control shaft 116. By way of the tension spring 118 the arresting lever 115 is held at its angled stop edge 121 in engagement with the pin 119. A second tension spring 122 is connected with the pin 119 and is connected distant from the latter to a shaft 123. The follower roller 124 which is supported for rotary movement by the scanning lever 120 is engaged by the cam disc 125 which thus determines the position of the feeler or scanning lever 120, this cam 125 being riveted to a gear 126 which is supported for rotary movement on the printing mechanism shaft 127 and which meshes with the toothed sector 128 of the differential mechanism 100.

The automatic controls for producing single, double, or quadruplicate tags during two or four machine runs which take place sequentially is described in detail in U.S. patent application Ser. No. 604,828, now abandoned but for the purposes of the present invention the producing of only a single tag derived from a suitable roll is described in detail.

The above-mentioned toothed sector 104 (FIG. 9) meshes with a gear 130 supported for rotary movement on a shaft 131 and riveted to a function selecting cam 132. This cam acts on a follower lever 133 which carries by way of a link 134 a coupling pin 135 of square cross section. The coupling pin 135 can, as is known, be shifted into three positions, namely the position A (addition), the position Z (subtotal) and the position E (grand total). In this way the pin 135 selects one of the follower levers 136 which are arranged one behind the other and each of which coacts with a correspondingly shaped cam pair 137.

The toothed sector 104 also meshes with a pinion 138 which is fixed to a rotary shaft 139 which acts on the known automatic calculating mechanism selecting control device by means of which the calculating mechanisms 61–64 or the accumulator means 60 in a known way, in accordance with the particular function of the selected machine run, are moved toward or away from the setting sectors 56, 58, 59 which respectively coact therewith.

The differential mechanism 54 of the value key bank 47 is provided with toothed sectors 140 meshing with gears 141 which are respectively fixed to tubular shafts 142 which are telescoped one within the other and which lead to the printing mechanism 143, shown in FIG. 3. In the printing mechanism 143 there are gears 144 which are fixed to the tubular shafts 142 and which serve to set the type-carrying printing wheels 145 and 147. Printing hammers 148 and 149 respectively coact with the printing type wheels 145 which produce simple printing and with the print type wheels 146 which produce mechanically readable special printing, these hammers being controlled in a known way. Beneath the printing type wheels 145 and 146 there is a special inked tape 150 which during the printing operations unwinds from a supply spool 151 and is wound onto a take-up spool 152. The printing type wheels 147 serve to mark the above-mentioned control tape 44 which is taken from a supply roll 153 through a guide 154 to the type wheels 147, a transporting device 155 transporting the tape 44 in the particular type of machine which is shown in the illustrated example to the control tape delivering unit 43. The feeding of the tag strip 30 is brought about by means of supply teeth 156 of a supply wheel 157 from an unillustrated supply roll situated in a lower part of the machine housing 159 or the tag strip may be supplied from the exterior of the machine in the manner shown in U.S. patent application Ser. No. 604,828. A cutting device 159 separates the individual tags 30 from each other during issue thereof from the machine.

In a manner which is schematically indicated in FIG. 11, the printing type wheels 145–147 are divided into a pair of groups, and the same is true of the printing hammers 148 and 149 which coact therewith, FIG. 11 schematically indicating the manner in which the printing functions sequentially follow one another. The first group of wheels 145–147 are actuated by the hammers 148 and 149 which coact therewith and which are controlled in a known way during a first printing operation when the purchase price is printed, as is also indicated in FIG. 12, while during a second printing operation the second group of printing hammers 148 and 149 are set into operation, the typing wheels having initially been automatically set to the purchase price.

At the beginning of these operations information such as the date when the goods was received or the like is initially set into the machine (see FIG. 12) together with a control symbol in the form of a letter F or the like by means of the value keys in connection with the control key 15, this information being printed on the control tape 44 and transferred to a connected unillustrated punch tape device in a known manner. Then follows the introduction of the purchase price, after previous setting of the value keys to the article number, the identification number of the supplier and the purchase price being transferred into the accumulator means 60 by means of the key 17. Upon termination of the machine run during which these values are introduced into the machine, with the particular values which have been set being transferred to the accumulator means 60, the value keys 23 and the control keys are again released in a known manner. Now the purchase price, the article size, as well as an indentification number for the particular season are set into the keys and after the tag strip is guided from the tag supply roll into the machine the first tag 30 which is to be printed is led to the printing position beneath the type wheels 145 and 146.

Now the counter 39, 40 is adjusted to the number of tags 30 which are to be made, and this number is introduced into the machine by way of the lever 38. Upon actuation of the control key 14 the first machine run is set into operation, and during this first machine run the first printing (see FIG. 11) on the tag 30 (FIG. 4) is carried out. During this machine run, which takes the form of a subtotal machine run, the calculating mechanism 60 which forms the accumulator means is scanned, the purchase price, the identification number of the supplier and the article number having been stored in the accumulator means 60, as pointed out above. The control of the subtotal machine run takes place by way of the slider means 107 (FIGS. 9 and 10) which at this time is held at the position "11," and thus the run selecting cam 132, which selects the particular calculating function which is to be performed is placed in a position for selecting the proper function, the cam 132 in this case being positioned to select the cam pair 137 for providing a subtotal machine run, and at the same time the pinion 138 brings about operation of the calculating mechanism or accumulator means 60 in proper rhythmic synchronization with the subtotaling function.

By way of the control cam 97 (FIG. 8) during this machine run the pawl 89 (FIGS. 5 and 6) is raised, so that the blocking hook 66 is displaced away from the pin 70, thus placing the coupling means 66, 70 in its uncoupled position, with the result that the primary slider means 72 which coact with the value key rows 23–25 do not operate at this time and instead only the auxiliary slider means 51, which are not influenced by the value keys 23, operate during the scanning of the calculating mechanism 60 which forms the accumulator means. The depressed keys 23 remain in their depressed positions as a result of the action of the arresting sliders 49. The scanned values which are taken from the accumulator means 60 are printed on the tag 30 as the machine run progresses. (See FIG. 11.)

The control device for selecting particular machine runs or functions is provided with an unillustrated function or mode-of-operation rail which in a known way (see U.S. Patent 3,181,784) is moved at each machine run into an "addition" function position. The values taken from the accumulator means 60 for the purchase price are transferred to the calculating mechanisms 61 and 62 during this substotal machine run, and these calculating mechanisms 61 and 62 are displaced by means of the selected function rail to and from their operating positions in synchronism with the function "addition" during this machine run in a known manner. The supplier number and the article number of course are not transferred into the calculating mechanisms 61 and 62.

Upon termination of this latter machine run, during which the values taken out of the accumulator means 60 are again stored therein, the cam 125 (FIGS. 9 and 10) is moved to a position in which by way of the follower lever 120 the stop lever 115 is set to a position where during the next-following machine run which automatically takes place in a known manner the slider means 107 is held in the position "9." In this position the machine is controlled to carry out an "addition" function, and at this time the depressed value keys 23 are scanned, and these scanned values are printed on the control strip 44 and the tag 30, while the scanned purchase price is transferred to the calculating mechanisms 63 and 64.

Upon termination of this latter machine run, the cam 125 turns the arresting lever 115 beyond the operating range of the stops 111–113, so that during the next following machine run which is also automatically initiated the slider means 107 can again move up to the position "11," in which a further subtotal machine run is carried out. Moreover, by means of the tag-feeding wheel 157 a further tag 30 is positioned beneath the wheels 145 and 146 and the tag 30 which was initially printed is severed from the tag strip by the cutting means 159 and is delivered from the machine. The depressed value keys 23 remain in their depressed positions and can, after the counter 39, 40 has run down to its zero position so that the sequential machine runs are interrupted, be returned to their starting positions by actuation of the clearing lever 46.

By actuating the control keys 18 and 19 which bring about operation of the machine to carry out a grand total run, the turnover for each group of goods is taken from the calculating mechanisms 61 and 63 and transferred to a punch tape and the control strip 44.

The daily sales or turnover are contained in the calculating mechanisms 62 and 64 and can be obtained therefrom by actuation of the control keys 20 and 21.

Instead of an arrangement as described above where the printed values are alternately taken from the accumulator means 60 and the value keys 23, it is possible, if necessary, to provide still further accumulator means which by a suitable configuration for the cam 125 (FIG. 10) can be controlled to sequentially provide the values in an automatic manner.

Also, the disconnections of the primary slider means 72 from the operations can, in contrast to the above example where they are shown as being used only for subtotal and grand total machine runs, also be used for predetermined addition machine runs, and this variation can be achieved simply by changing the configuration of the control cams 97.

Figure 2:
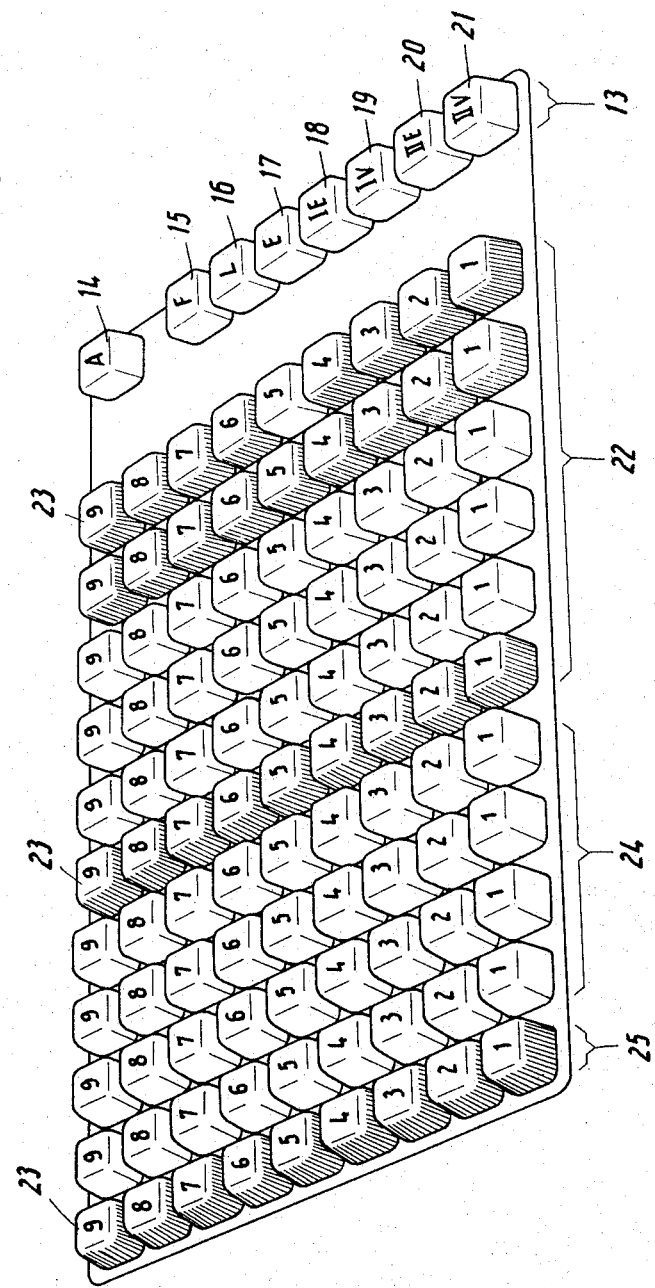
FIG. 2 is a perspective illustration of the keyboard thereof.

It will thus be seen that with the above-described structure the slider means 107 which coacts with the bank 13 of control keys forms part of an operating means which includes the structure shown at the upper left of FIG. 10 as well as the train of elements extending from the differential means 100 through the link 101 to the plate 99 and actuated in response to turning of the latter, this operating means including the shaft 98 and the control cam 97 which with the structure shown in FIG. 8 actuates through the shaft 90 and the pawl 89 the coupling means 66, 70 so as to form automatic controls providing for alternate coaction of the operating means with the accumulator means 60 and the key means formed by the keys shown in FIG. 2.

To those skilled in the art it will be obvious upon a study of this disclosure that my invention permits of various modifications and may be given embodiments other than particularly described and illustrated herein, without departing from the essential features of the invention and within the scope of the claims annexed hereto.

I claim:

1. In a business machine capable of automatically performing a plurality of machine runs sequentially, accumulator means for storing value and other information items, manually operable key means for introducing transaction items into the machine, calculating means for carrying out different calculations with said items, printing means for printing on sheet material which issues from the machine, and operating means coacting during the sequential machine runs with said calculating means and printing means for carrying out calculating and printing operations, said operating means coacting at sequential machine runs alternately with said accumulator means and said key means, respectively, for transferring alternately from said accumulator means and from said key means items to be used in said operations.

2. The combination of claim 1 and wherein said operating means includes automatic controls for alternate coaction with said accumulator means and key means.

3. The combination of claim 2 and wherein said manually operable key means includes a plurality of banks of value keys, said operating means including for each bank of value keys a pair of slider means one of which is a primary slider means for scanning said bank of value keys, said primary slider means being operatively connected with said calculating means and printing means for setting said calculating means and printing means, and the other of said pair of slider means being an auxiliary slider means, differential means operatively connected to said auxiliary slider means to be actuated thereby, and releasable coupling means, for coupling and uncoupling said pair of slider means, actuated by said automatic controls of said operating means for uncoupling said pair of slider means at every other run when said operating means coacts with said accumulator means and for coupling said pair of slider means at the alternate runs when said operating means coacts with said key means.

4. The combination of claim 3 and wherein said coupling means includes a pin and a release pawl coacting with said pin and actuated by said automatic controls.

5. The combination of claim 4 and wherein said machine runs include subtotal and grand total runs, and said operating means uncoupling said pair of slider means during said subtotal and grand total machine runs.

6. The combination of claim 5 and wherein said key means includes a bank of manually operable control keys and said operating means including a third slider means for scanning said control keys, said automatic controls including a control cam coacting with said coupling means for uncoupling the latter, and said third slider means coacting with said control cam for determining the position of the latter which actuates said coupling means to uncouple said pair of slider means.

7. The combination of claim 6 and wherein said machine runs include subtotal and addition runs, said operating means when coacting with said accumulator means transferring items therefrom to said printing means during subtotal runs and to said calculating means during addition runs, and arresting slider means coacting with said banks of value keys for maintaining depressed value keys in their depressed positions during the runs when said operating means coacts with said accumulator means.

8. The combination of claim 7 and wherein said automatic controls actuate said coupling means to couple said pair of slider means during alternate runs when said primary slider means scans the bank of value keys and is thus connected through said auxiliary slider means with said differential means.

References Cited

UNITED STATES PATENTS 2,821,341   1/1958   Barnhardt _____ 235—60
3,006,538   10/1961  Deutsch _____ 235—2

STEPHEN J. TOMSKY, Primary Examiner

U.S. Cl. X.R.

235—60, 62